(12) United States Patent
Renard et al.

(10) Patent No.: US 11,736,360 B2
(45) Date of Patent: Aug. 22, 2023

(54) COMMUNICATION SYSTEM COMPRISING A PLURALITY OF PROCESSORS AND AT LEAST ONE SWITCH, AND ASSOCIATED COMMUNICATION METHOD

(71) Applicant: THALES, Courbevoie (FR)

(72) Inventors: Benoit Renard, Mérignac (FR); Olivier Quijada, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/700,917

(22) Filed: Mar. 22, 2022

(65) Prior Publication Data
US 2022/0311672 A1    Sep. 29, 2022

(30) Foreign Application Priority Data
Mar. 24, 2021   (FR) ...................................... 21 02957

(51) Int. Cl.
| | | |
|---|---|---|
| *G06F 15/173* | (2006.01) | |
| *H04L 41/12* | (2022.01) | |
| *H04L 41/0806* | (2022.01) | |
| *H04L 41/0893* | (2022.01) | |

(52) U.S. Cl.
CPC .......... *H04L 41/12* (2013.01); *H04L 41/0806* (2013.01); *H04L 41/0893* (2013.01)

(58) Field of Classification Search
CPC .. H04L 41/12; H04L 41/0806; H04L 41/0893
See application file for complete search history.

(56) References Cited

FOREIGN PATENT DOCUMENTS

| | | |
|---|---|---|
| EP | 3 614 273 A2 | 2/2020 |
| EP | 3 614 273 A3 | 2/2020 |
| WO | WO 2019/090032 A1 | 5/2019 |

OTHER PUBLICATIONS

French Search Report, from the French Patent Office in counterpart French Application No. 2102957, dated Dec. 10, 2021.

*Primary Examiner* — Wing F Chan
*Assistant Examiner* — Joseph R Maniwang
(74) *Attorney, Agent, or Firm* — ArentFox Schiff LLP

(57) ABSTRACT

The present invention relates to a communication system comprising a plurality of processors and at least one switch, referred to as a main switch, connecting the processors into a main communication network;
the system being characterised in that it further comprises at least one other switch, called an auxiliary switch, connecting the processors in an auxiliary communication network, and in that the auxiliary communication network is intended to be used by the processors to initialise the main communication network.

10 Claims, 3 Drawing Sheets

COMMUNICATION SYSTEM COMPRISING A PLURALITY OF PROCESSORS AND AT LEAST ONE SWITCH, AND ASSOCIATED COMMUNICATION METHOD

FIELD OF THE INVENTION

Cross-Reference to Related Applications

This application claims priority to French Application No. 21 02957, filed on Mar. 24, 2021. The disclosure of the priority application is incorporated in its entirety herein by reference.

The present invention relates to a communication system comprising a plurality of processors and at least one switch.

The present invention also relates to a communication method associated with such a communication device.

The invention is used in particular in the communication fields of embedded electronics with high computing power.

BACKGROUND OF THE INVENTION

As is well known, in these areas, communication buses are key points for carrying out dedicated functions. For this purpose, these communication areas often use fast communication buses with PCIe switches, also known as PCI Express (Peripheral Component Interconnect Express).

An example of a communication network implemented by such a switch is shown in FIG. 1. Thus, in this figure, the processors P1 to P4 are connected to each other in a communication network by two switches S1 and S2. The switches S1 and S2 are interconnected and each of the processors P1 to P4 is connected to one of these switches S1 and S2.

The type of communication between the processors in the network as shown in FIG. 1 is based on memory exchanges with address translations and remote signalling. This technology is typically used to implement the data distribution required for NUMA (non-uniform memory access) systems. Thus, in order to communicate from one processor to another, it is necessary to set up a plurality of addressing and translation domains.

However, several problems arise when setting up this type of communication.

First of all, it is impossible to know the start-up status of a remote processor without having to talk to it, i.e. to use a network that is being initialised. This problem can occur at start-up when all the processors on the network are not synchronous and can also fail. Locally, it is therefore not possible to know the overall state of the environment as there is no assurance that the memory translations are all programmed and the processors are booted and healthy. In addition, when a communication is initiated on a partially or uninitialised network, errors occur on the transmitter. It is impossible for the transmitter to distinguish whether they are normal (due to incomplete initialisation) or real (bus problems). This point thus prevents any network testability at start-up.

In addition, since the communication mechanisms are address translations, it is necessary to know the physical addresses on the receiving end in order to communicate to a remote processor. For this purpose, in some cases, it is possible to reserve physical addresses, where only incoming communication will arrive. However, this imposes many constraints on the use of memory (under-utilisation of memory).

Finally, in order to test the network at start-up, it is necessary that all its components are in place. However, in order to know a network initialisation state, it is necessary to communicate to all the nodes of the network. However, this is not possible in a switched PCIe network without installing address translations. It is therefore impossible for a local node to know the health of the global network at initialisation.

To remedy these problems while maintaining the performance of the PCIe type switched network, the state of the art proposes to make all the configuration data necessary for the initialisation of such a network static. In particular, this requires the implementation of static reservation of all communication areas on all nodes and static programming of all address translations.

However, this solution makes the configuration of the network rigid and does not allow for any changes to be made during its use. For example, in the event of a change in the use of the network (resizing, addition and/or removal of new elements), all configurations must be redone (physical address reservation, address translations). Thus, in order to provide for the possibility of modification without having to redo the configurations, the communication areas are generally oversized, which implies an under-utilisation of resources.

SUMMARY OF THE INVENTION

The present invention aims to remedy all the above-mentioned problems and to propose a communication system allowing the implementation of a high performance communication network, such as a PCIe type network, without having to make this network static and/or to over-size its various components.

For this purpose, the invention relates to a communication system comprising a plurality of processors and at least one switch, called a main switch, connecting the processors into a main communication network.

The system is characterised in that it further comprises at least one other switch, called an auxiliary switch, connecting the processors in an auxiliary communication network, and in that the auxiliary communication network is intended to be used by the processors to initialise the main communication network.

In other beneficial aspects of the invention, the system comprises one or more of the following features, taken in isolation or in any technically possible combination:
- the main communication network has a higher throughput than the auxiliary communication network;
- the main communication network is a switched PCIe network;
- the auxiliary communication network complies with an ETHERNET-type data exchange protocol,
- comprising at least two main switches connected to each other, the processors connected to a single main switch forming a single communication domain;
- upon establishment of the auxiliary network, each processor is configured to send into that auxiliary network a broadcast message comprising at least one element selected from the group:
  - physical address of the processor and start address of its communication area;
  - unique identifier of the processor;
- at least one processor, referred to as the master processor, is configured to generate a synthesis of the received broadcast messages and to send this synthesis to all other processors;

each processor is configured to program all its local translations to remote addresses from the received synthesis;

each processor of the same communication domain is configured to determine a management processor among all the processors of that communication domain;

the management processor being configured to determine a routing configuration of the main switch of the corresponding communication domain from the received synthesis;

the management processor is determined by an analysis of the identifiers of all the processors in the corresponding communication domain.

The invention also relates to a method of communication in the communication system as described above, comprising initialising the main communication network using the auxiliary communication network.

BRIEF DESCRIPTION OF THE DRAWINGS

Characteristics and advantages of the invention will become apparent upon reading the following description, given only as a nonlimiting example, referring to the attached drawings, in which.

DETAILED DESCRIPTION OF THE INVENTION

Figure 1:
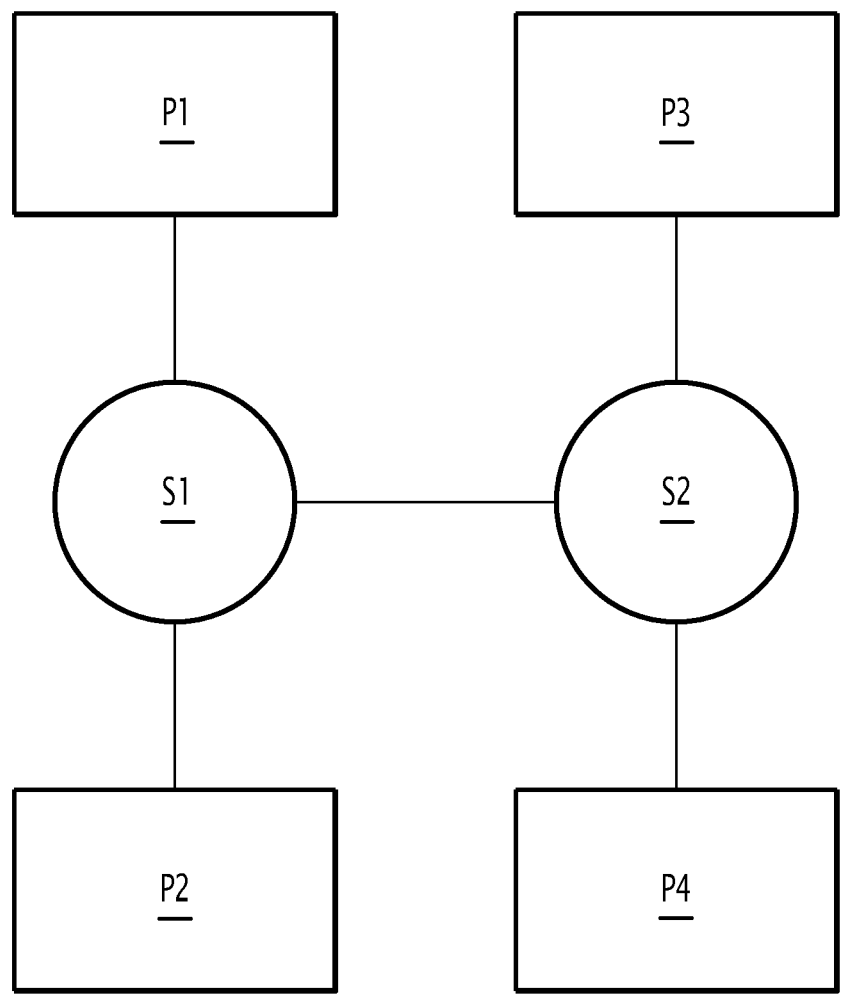
FIG. 1 is a schematic view of a communication system implementing a switched PCIe network according to the prior art.
Figure 2:
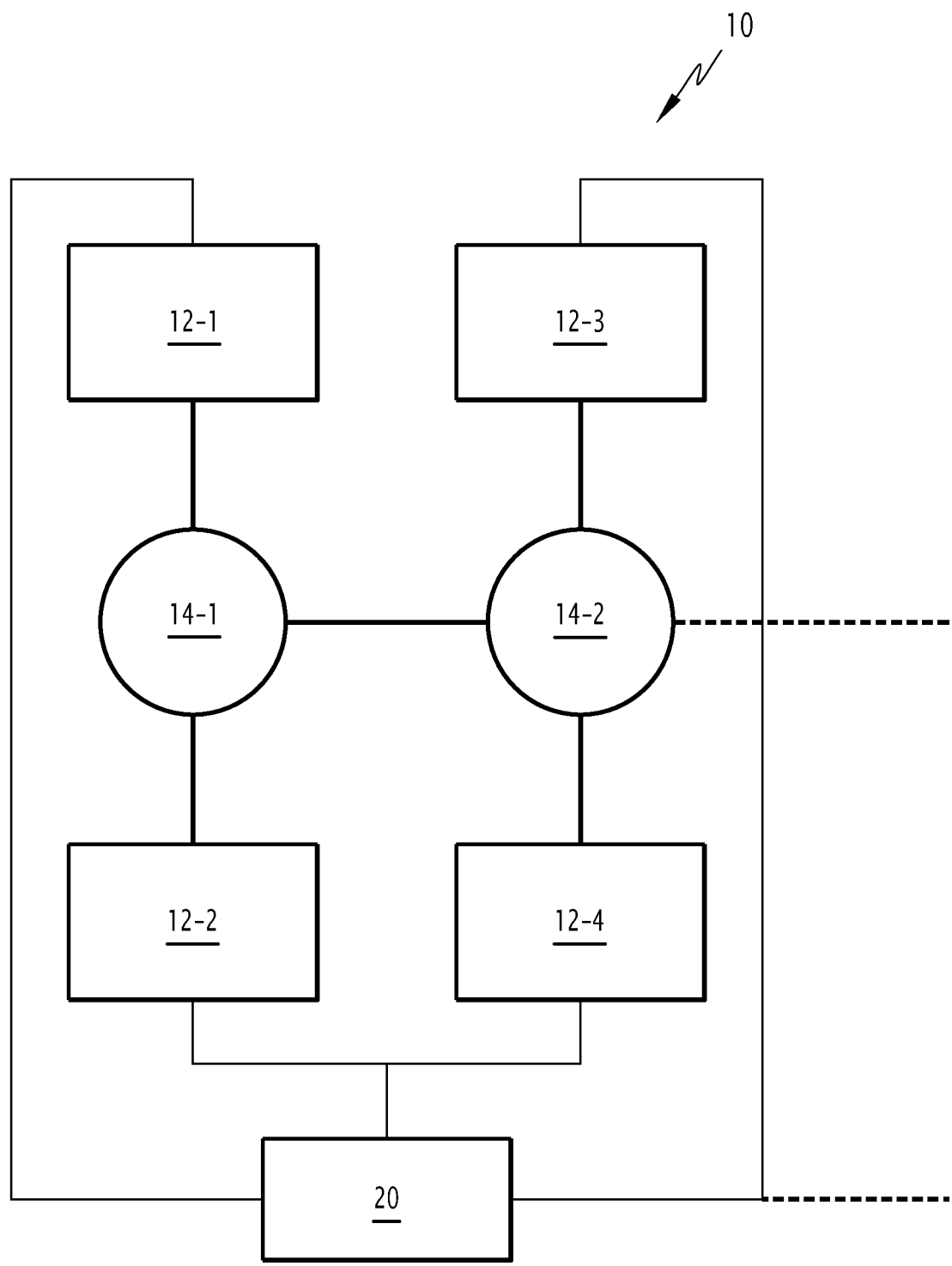
FIG. 2 is a schematic view of a communication system according to the invention.

FIG. 2 shows a communication system 10 according to the invention. The communication system 10 has, for example, one or more embedded systems, including one or more avionics systems.

The communication system 10 comprises a plurality of processors 12-1, ..., 12-N and one or more main switches 14-1, ..., 14-M connecting these processors 12-1, ..., 12-N into a main communication network.

Each processor 12-1, ..., 12-N, also known as a node or computational node or computer, has a processor known per se that can be used in particular in the avionics field. In the example shown in FIG. 2, four processors 12-1 to 12-4 are illustrated.

The main switches 14-1, ..., 14-M connect the processors to each other, thus forming a switched network, using suitable connection means. These connection means include communication buses known per se. Each switch 14-1, ..., 14-M is thus implemented in accordance with the transmission protocol usable in the switched network by the corresponding connection means. In the example shown in FIG. 2, two switches 14-1 and 14-2 connected to each other are illustrated. In the same example, the switch 14-1 is connected directly to processors 12-1 and 12-2 and switch 14-2 is connected directly to processors 12-3 and 12-4.

Depending on how the processors 12-1, ..., 12-N are interconnected with the switches 14-1, ..., 14-M, the communication system 10 forms one or more communication areas. In particular, the processors 12-1, ..., 12-N connected to the same main switch 14-1, ..., 14-M form a single communication domain. Thus, in the example shown in FIG. 2, processors 12-1 and 12-2 with switch 14-1 form one communication domain and processors 12-3 and 12-4 with switch 14-2 form another communication domain.

The main communication network formed by the main switches 14-1, ..., 14-M is for example a high-performance (high-speed) network, such as a PCIe type network, also called PCI Express. In particular, the term "PCIe-type network" means a network using PCIe communication buses of any existing version and any future version whose technical specifications are compatible with those described in this document.

According to the invention, in addition to the main switches 14-1, ..., 14-M forming the main network, the communication system 10 comprises at least one auxiliary switch 20 connecting the processors 12-1, ..., 12-N into an auxiliary communication network, separate from the main communication network.

This auxiliary communication network enables the main communication network to be initialised and for this purpose has simplified initialisation facilities compared to those of the main communication network. For example, the auxiliary communication network allows automatic initialisation of each of the processors 12-1, ..., 12-N in the auxiliary communication network.

In addition, the auxiliary communication network has a lower performance, such as the communication rate, than the main communication network. This auxiliary communication network is, for example, designed to only initialise the main communication network and is not usable during nominal operation of the communication system 20.

According to one example, the auxiliary communication network is a switched ETHERNET-type network. In particular, the term "ETHERNET-type network" means a network using the ETHERNET protocol of any existing version and any future version whose technical specifications are compatible with those described in this document.

Other examples of the respective choice of the types of the main and auxiliary communication network are possible.

In the example shown in FIG. 2, only one auxiliary switch 20 is shown. However, the number of switches used is chosen according to the protocol and topology of the auxiliary communication network.

The or each auxiliary switch 20 is implemented according to the communication protocol it implements.

Furthermore, advantageously according to the invention, the or each auxiliary switch 20 is connected to the processors 12-1, ..., 12-N by connection means distinct from those of the main switches 14-1, ..., 14-M. These connection means may be wired and/or wireless.

Figure 3:
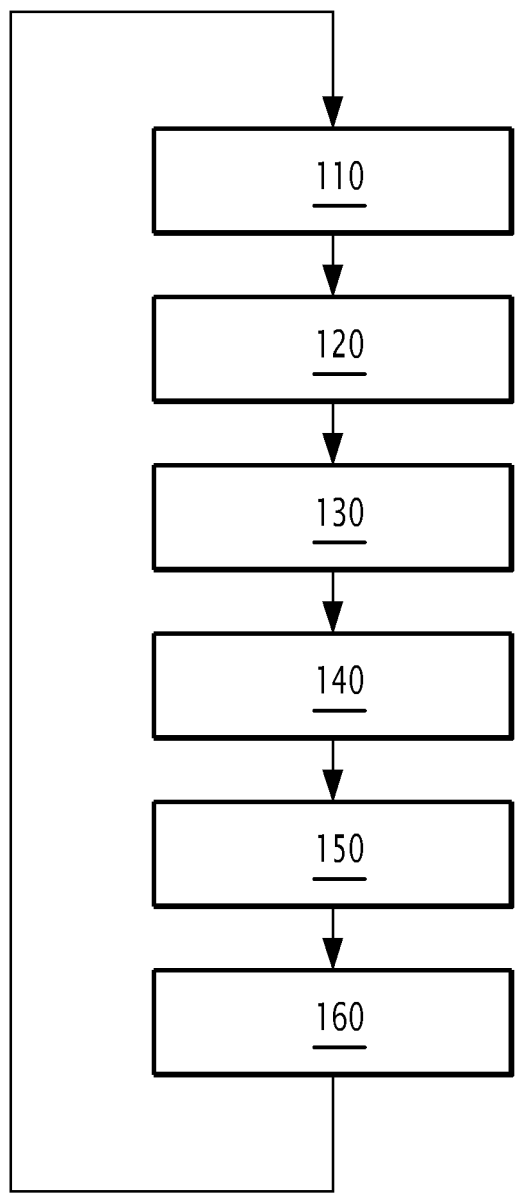
FIG. 3 is a flowchart of a method for communication according to the invention, the method being implemented by the communication system of FIG. 2.

The communication method implemented by the communication system 10 according to the invention will now be explained with reference to FIG. 3, which shows a flowchart of its steps.

According to the invention, this method is implemented to initialise the main communication network using the auxiliary communication network. Such an initialisation is, for example, carried out when the communication system 10 is started up for the first time or when the communication system 10 is changed in a way that involves structural modifications. For example, such a change may comprise adding and/or removing a processor in the system 10.

It is further considered that at the time of implementation of the communication method, the auxiliary communication network is already initialised, for example automatically, according to techniques known per se.

In an initial step 110, each processor 12-1, ..., 12-N performs internal local programming. In particular, in this step, the communication stack of each processor 12-1, . . . , 12-N allocates exactly the amount of contiguous physical memory required with respect to the hosted applications and schedules an access port to the corresponding main switch 14-1, . . . , 14-M.

In a subsequent step 120, each processor 12-1, . . . , 12-N sends a broadcast message comprising at least one element selected from the group:
 its physical address and the start address of its communication area;
 its unique identifier.

In a subsequent step 130, the processors 12-1, . . . , 12-N receive, via the auxiliary network, the broadcast messages sent by the other processors 12-1, . . . , 12-N, and from among all the processors 12-1, . . . , 12-N, one processor, known as the master processor, generates a synthesis of the broadcast messages received. Such a summary shows, for example, a concatenation of all received broadcast messages.

The master processor has, for example, the fastest processor that has received the broadcast messages within a predetermined time period and has made a corresponding synthesis.

The master processor then sends this synthesis to all the other processors, which send an acknowledgement back to the master processor.

In a subsequent step 140, the master processor implements an installation of the network.

In particular, in this step, the master processor sends a local installation message to each of the other processors.

Upon receipt of such a message, each processor schedules local address translations to remote addresses. These remote addresses are determined by each of the processors 12-1, . . . , 12-N from the received synthesis, applying the same algorithm. For example, according to such an algorithm, remote addresses are linked to the unique identifier of the corresponding processor and the size of its communication area. Thus, remote addresses can be fixed.

In the same step 140, the master processor further sends inter-switch translation setup messages.

Upon receipt of such a message, the processors 12-1, . . . , 12-N of the same communication domain determine a management processor from among all the processors of that communication domain. This choice can be made for example by a predetermined algorithm, based for example also on the identifiers of the processors 12-1, . . . , 12-N.

Then, in each communication domain, the management processor schedules all inter-switch communications in that communication domain. In particular, the management processor determines a routing configuration of the main switch of the corresponding communication domain from the received synthesis.

At the end of this step, each processor 12-1, . . . , 12-N sends an installation confirmation message to the master processor.

In a subsequent step 150, the master processor waits for the reception of all the installation confirmation messages and sends to all the processors 12-1, . . . , 12-N an installation completion message.

In a subsequent step 160, a diagnosis of the main communication network is initiated. When this diagnosis is positive, the main communication network can then be used in its nominal operation. Otherwise, at least some of the above steps can be repeated using the auxiliary communication network.

It is therefore clear that the present invention has a number of advantages.

In effect, the invention allows a high performance core communication network, such as a PCIe-type switched network, to be initialised using another network which is simpler, or even automatic, to initialise.

The main communication network can thus use a dynamic configuration that can be adapted to different changes that may occur during the operation of the system 10. This also avoids oversizing the network, as only the settings necessary for its actual configuration are made.

The invention claimed is:

1. A communication system comprising a plurality of processors and at least one switch, referred to as a main switch, connecting the processors into a main communication network;
 wherein the system comprises at least one other switch, called an auxiliary switch, connecting the processors in an auxiliary communication network, and wherein the auxiliary communication network is configured to be used by the processors to initialise the main communication network;
 wherein upon connecting the processors in the auxiliary communication network, each processor is configured to send into that auxiliary network a broadcast message comprising at least one element selected from the group:
  a physical address of the processor and a start address of a communication area of the processor; and
  a unique processor identifier.

2. The communication system according to claim 1, wherein the main communication network has a higher throughput than the auxiliary communication network.

3. The communication system according to claim 1, wherein the main communication network is a switched PCIe-type network.

4. The communication system according to claim 1, wherein the auxiliary communication network complies with an ETHERNET-type data exchange protocol.

5. The communication system according to claim 1, comprising at least two main switches connected to each other, the processors connected to the same main switch forming a same communication domain.

6. The communication system according to claim 5, wherein at least one processor, referred to as a master processor, is configured to generate a synthesis of the received broadcast messages and to send this synthesis to all other processors, and wherein each processor of the same communication domain is configured to determine a management processor from the set of processors of that communication domain;
 the management processor being configured to receive the synthesis from the master processor and to determine a routing configuration of the main switch of the same communication domain of the management processor, from the received synthesis.

7. The communication system according to claim 6, wherein the management processor is determined by an analysis of unique processor identifiers of all processors of the corresponding communication domain of the management processor.

8. The communication system according to claim 1, wherein at least one processor, referred to as a master processor, is configured to generate a synthesis of the received broadcast messages and to send this synthesis to all other processors.

9. The communication system according to claim 8, wherein each other processor is configured to receive the synthesis from the master processor and to program all local translations to remote addresses determined from the received synthesis.

10. A method of communicating within the communication system according to claim 1, comprising initialising the main communication network using the auxiliary communication network.

\* \* \* \* \*